United States Patent
Sundaresan

(10) Patent No.: US 12,244,707 B2
(45) Date of Patent: Mar. 4, 2025

(54) SYSTEM AND METHOD FOR SHARING AN INCREMENTALLY TRAINED MACHINE LEARNING (ML) MODEL FROM AN EDGE DEVICE TO ONE OR MORE OTHER EDGE DEVICES IN A PEER TO PEER NETWORK

(71) Applicant: swarmin.ai, Fremont, CA (US)

(72) Inventor: Subash Sundaresan, Fremont, CA (US)

(73) Assignee: Subash Sundaresan, Fremont, CA (US)

( * ) Notice: Subject to any disclaimer, the term of this patent is extended or adjusted under 35 U.S.C. 154(b) by 1047 days.

(21) Appl. No.: 16/953,095

(22) Filed: Nov. 19, 2020

(65) Prior Publication Data

US 2021/0250166 A1   Aug. 12, 2021

Related U.S. Application Data

(60) Provisional application No. 62/972,580, filed on Feb. 10, 2020.

(51) Int. Cl.
| | |
|---|---|
| *G06N 3/098* | (2023.01) |
| *G06N 3/096* | (2023.01) |
| *G06N 20/00* | (2019.01) |
| *H04L 9/08* | (2006.01) |
| *H04L 9/30* | (2006.01) |
| *H04L 67/1074* | (2022.01) |

(52) U.S. Cl.
CPC ............ *H04L 9/088* (2013.01); *G06N 3/096* (2023.01); *G06N 3/098* (2023.01); *G06N 20/00* (2019.01); *H04L 9/30* (2013.01); *H04L 67/1074* (2013.01)

(58) Field of Classification Search
CPC ............ G06N 3/096; G06N 3/098; G06N 3/00
See application file for complete search history.

(56) References Cited

U.S. PATENT DOCUMENTS 11,531,846 B1 * 12/2022 Bodapati ............... G06N 20/00
2020/0394470 A1 * 12/2020 Ganapavarapu ....... G06N 20/00

OTHER PUBLICATIONS

"An intelligent healthcare system with peer-to-peer learning and data assessment", Masters thesis submitted by Rongjun Xie, record created in 2019, and retrieved from https://researchrepository.rmit.edu.au/esploro/outputs/9921863819401341, (Year: 2019).*

"Making AI Forget You: Data Deletion in Machine Learning" by Antonio Ginart et al, from 33rd Conference on Neural Information Processing Systems (NeurIPS 2019), Vancouver, Canada and retrieved from https://arxiv.org/abs/1907.05012. (Year: 2019).*

* cited by examiner

Primary Examiner — Sanchita Roy

(57) ABSTRACT

A method for sharing an incrementally trained machine learning (ML) model from an edge device to other edge devices that are associated with a peer to peer network is provided. The method includes (i) receiving event data at an edge device from among one or more edge devices of the peer to peer network upon the occurrence of an event at the edge device, (ii) incrementally training a base version of a ML model at the edge device based on the received event data, (iii) generating, a unique persistent file format of the incrementally trained ML model at the edge device, (iv) optimizing a payload associated with the unique persistent file format to include one or more parameters with associated weights changing beyond a predetermined configurable threshold and (v) encapsulating the unique persistent file format with a unique metadata.

12 Claims, 8 Drawing Sheets

| PUBLIC KEY 402A | PRIVATE KEY 402B | SALTING PARAMETERS 404 |
|---|---|---|
| | | |

SYSTEM AND METHOD FOR SHARING AN INCREMENTALLY TRAINED MACHINE LEARNING (ML) MODEL FROM AN EDGE DEVICE TO ONE OR MORE OTHER EDGE DEVICES IN A PEER TO PEER NETWORK

CROSS-REFERENCE TO RELATED APPLICATIONS

This patent application claims priority to US provisional patent application Ser. No. 62/972,580, filed on Feb. 10, 2020 and U.S. provisional patent application Ser. No. 62/965,099, filed on Jan. 23, 2020, the complete disclosures of which, in their entireties, are hereby incorporated by reference.

BACKGROUND

Technical Field

Embodiments of this disclosure generally relate to training machine learning (ML) models, and more particularly, to a system and method of sharing the incrementally trained machine learning (ML) model from an edge device to one or more other edge devices associated with a peer to peer network.

Description of the Related Art

Machine learning techniques are typically used to build a model or rule set to predict a result based on the values of one or more features. Machine learning techniques typically involve the use of a data set that includes, for each record, a value for each of a set of features, and a result. A model or rule set for predicting the result is developed based on the data set. Machine learning techniques generally build on statistical underpinnings. Statistical approaches test a proposed model against a set of data. Machine learning techniques search through a space of possible models, to find the best model to fit a given set of data used for various commonly seen use cases such as personalization of user experiences, a recommendation of products, medical diagnosis, and the like.

Typically, machine learning techniques follow a data flow architecture that involves sending data from usage of relevant applications or websites by end-users of edge devices to a central server, where the edge devices may include devices such as smartphones, tablets, computers, smartwatches, internet of things (IoT) devices, connected vehicles, and the like. The server aggregates all the data gathered from the edge devices and uses the data to train a machine learning (ML) model. The trained ML model is subsequently used for decisions, for example personalization or product recommendations, medical diagnosis, and the like. An example of a typical network environment for machine learning is depicted in FIG. 1 that includes a plurality of edge devices 102A-N associated with a plurality of users 104A-N, a network 106, and a server 108. Typically, data associated with the plurality of edge devices 102A-N, including, for example, data associated with usage of applications or websites are transferred to the server 108 through the network 106. The server 108 aggregates all the data received and trains a machine learning (ML) model based on the aggregated data. The trained ML model is subsequently used for decisioning for various technical purposes, such as, for example, for personalization of user experience, for providing product recommendations, medical diagnosis, and the like.

However, the above-described architecture for training the ML model has several disadvantages. For instance, sending data associated with the plurality of users 104A-N to the server 108 causes privacy and/or security concerns as the data may be shared with and/or used by third parties without a consent of the plurality of users 104A-N. Also, in several exemplary scenarios, data on the server 108 may be hacked by malicious actors, thereby causing data leaks. The data may include sensitive data such as health or financial records, or location data, among many others. Due to the privacy and data security concerns such as those mentioned above, many owners of application and websites may be reluctant to share such valuable data with the server 108, thereby potentially denying the benefits that ML models based on that data can provide to end-users, such as, for example, being able to diagnose diseases based on medical data signals, or product recommendations based on analysing one or more user preferences. Additionally, the ML model generated based on known training techniques and commonly used for image recognition typically constitutes large file sizes imposing a significant load on the network on being repeatedly transmitted to the server 108. Moreover, traditional techniques of training the ML model involve slow learning and are not continuous, as the aggregation of data and updating of the training of the ML models is typically done periodically (such as at regular intervals every day).

Also, traditional techniques of training an ML model at the server 108 involve storage of persistent files containing cumulative records of all the preceding training steps/iterations on disk constituting a large volume of data on the server 108. The known techniques of training ML model do not address practical size constraints found in real-world use cases. ML models generated using the known techniques are usually large in size. For example, ML models commonly used for image recognition are typically of 35 Megabytes (Mb) in size and such large file sizes would impose a significant load on the network during transmission.

Accordingly, there remains a need for a system and method for mitigating and/or overcoming drawbacks associated with known techniques of training ML models at a server.

SUMMARY

In view of the foregoing, embodiments herein provide a processor-implemented method for sharing an incrementally trained machine learning (ML) model from a first edge device to other edge devices in a peer to peer network, the method including (i) generating a unique persistent file format of the incrementally trained ML model at the first edge device by removing details associated with user data that is used to incrementally train a base version of a first ML model, (ii) encrypting the unique persistent file format of the incrementally trained ML model to enable an authentication of the incrementally trained ML model generated at the first edge device and (iii) transmitting the incrementally trained ML model in the encrypted unique persistent file format from the first edge device to the other edge devices in the peer to peer network for incrementally training a second ML model of the other edge devices in the peer to peer network.

In some embodiments, the method includes incrementally training the base version of the first ML model based on event data received at the first edge device to obtain the incrementally trained ML model. In some embodiments, the first ML model includes at least one parameter and at least one weight associated with the at least one parameter.

In some embodiments, the method includes generating the base version of the first ML model at the first edge device. In some embodiments, generating the base version of the first ML model includes learnings based on data that was previously seen by the first edge device in the peer to peer network by removing underlying event data and retaining the at least one parameter and the at least one weight associated with the at least one parameter.

In some embodiments, the incremental training of the first ML model is performed by updating the at least one weight associated with the at least one parameter of the first ML model during a predetermined window of time.

In some embodiments, the method includes generating a hashed token for each event data item that is used to incrementally train the first ML model. In some embodiments, the hashed token includes (i) a unique device ID of the first edge device that originates an event, (ii) a timestamp of the event, and (iii) an event file size.

In some embodiments, the unique persistent file format is encrypted with a key that corresponds to the first edge device to enable the authentication of the incrementally trained model generated by the first edge device, wherein the key comprises a public key and a private key correspond to the first edge device.

In some embodiments, the unique persistent file format is encrypted with a time stamp and at least one salting parameter.

In some embodiments, the method further includes (i) optimizing a payload associated with the unique persistent file format to include the at least one parameter with associated the at least one weight changing beyond a predetermined configurable threshold; and (ii) encapsulating the unique persistent file format with a unique metadata to prevent reuse of the event data used for the incremental training of the first ML model at same or different edge device.

In some embodiments, the payload associated with the unique persistent file format is optimized by (i) extracting the at least one parameter and the at least one weight associated with the at least one parameter from specific data items, and (ii) determining if the at least one weight associated with the at least one parameter beyond the predetermined configurable threshold.

In some embodiments, the method further includes automatically tuning a frequency of updates to once every n data points per edge device based on a file size of the unique persistent file format of the first ML model.

In some embodiments, the frequency of updates is automatically tuned based on a frequency of incremental updates applied on the first ML model.

In another aspect, one or more non-transitory computer-readable storage mediums storing instructions, which when executed by a processor, causes to perform a method of sharing an incrementally trained machine learning (ML) model from a first edge device to other edge devices in a peer to peer network, the method performs the steps of (i) generating a unique persistent file format of the incrementally trained ML model at the first edge device by removing details associated with user data that is used to incrementally train a base version of a first ML model, (ii) encrypting the unique persistent file format of the incrementally trained ML model to enable an authentication of the incrementally trained ML model generated at the first edge device; and (iii) transmitting the incrementally trained ML model in the encrypted unique persistent file format from the first edge device to the other edge devices in the peer to peer network for incrementally training a second ML model of the other edge devices in the peer to peer network.

In some embodiments, the one or more non-transitory computer-readable storage mediums storing instructions, which when executed by the processor, further causes the method to perform the step of incrementally training the base version of the first ML model based on event data received at the first edge device to obtain the incrementally trained ML model. In some embodiments, the first ML model includes at least one parameter and at least one weight associated with the at least one parameter.

In some embodiments, the one or more non-transitory computer-readable storage mediums storing instructions, which when executed by the processor, further causes the method to perform the step of generating the base version of the first ML model at the first edge device. In some embodiments, generating the base version of the first ML model includes learnings based on data that was previously seen by the first edge device in the peer to peer network by removing underlying event data and retaining the at least one parameter and the at least one weight associated with the at least one parameter.

In some embodiments, the one or more non-transitory computer-readable storage mediums storing instructions, which when executed by the processor, further causes the method to perform the step of generating a hashed token for each event data item that is used to incrementally train the first ML model. In some embodiments, the hashed token includes (i) a unique device ID of the first edge device that originates an event, (ii) a timestamp of the event, and (iii) an event file size.

In some embodiments, the unique persistent file format is encrypted with a key that corresponds to the first edge device to enable the authentication of the incrementally trained model generated by the first edge device, wherein the key comprises a public key and a private key correspond to the first edge device.

In some embodiments, the unique persistent file format is encrypted with a time stamp and at least one salting parameter.

In some embodiments, the one or more non-transitory computer-readable storage mediums storing instructions, which when executed by the processor, further causes the method to perform the steps of (i) optimizing a payload associated with the unique persistent file format to include the at least one parameter with associated the at least one weight changing beyond a predetermined configurable threshold; and (ii) encapsulating the unique persistent file format with a unique metadata to prevent re-use of the event data used for the incremental training of the first ML model at same or different edge device.

In some embodiments, the payload associated with the unique persistent file format is optimized by (i) extracting the at least one parameter and the at least one weight associated with the at least one parameter from specific data items, and (ii) determining if the at least one weight associated with the at least one parameter is beyond the predetermined configurable threshold.

In another aspect, a system that includes a first edge device that shares an incrementally trained machine learning (ML) model to other edge devices in a peer to peer network is provided. The first edge device including a processor that is configured to (i) generate a unique persistent file format of the incrementally trained ML model at the first edge device by removing details associated with user data that is used to incrementally train a base version of a first ML model, (ii)

encrypt the unique persistent file format of the incrementally trained ML model to enable an authentication of the incrementally trained ML model generated at the first edge device and (iii) transmit the incrementally trained ML model in the encrypted unique persistent file format from the first edge device to the other edge devices in the peer to peer network for incrementally training a second ML model of the other edge devices in the peer to peer network.

Various embodiments herein enable the preservation of user data privacy as the user data stays with the user device and does not get aggregated on any server thereby eliminating the risk of data leaks caused by hacks of a central server. For example, sensitive health signals that are available to an application on a wearable device such as a smartwatch may now be used to predict a probability of the user getting a disease, without concerns about sending such sensitive data to a server. Various embodiments enable real-time machine learning to happen in real-time, as soon as a data event occurs on the edge device thereby improving the quality of the decisions made by the ML model. Various embodiments ensure that data used for generating a version of the ML model cannot be reused later, thereby preventing malicious actors from using the same data items to repeatedly train the model or to skew in their favour. Also, the encryption of the persistent file format enables the prevention of fraud by malicious actors by injecting unauthorized ML model versions into the peer to peer network. The encryption provides authentication that the ML model version originates from a legitimate data node in the peer to peer network. Additionally, the unique persistent file format of the ML models disclosed in various embodiments enable authenticity and prevent any spoofing/hijacking by rogue nodes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 illustrates a table that illustrates a unique persistent file format, according to some embodiments herein;

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
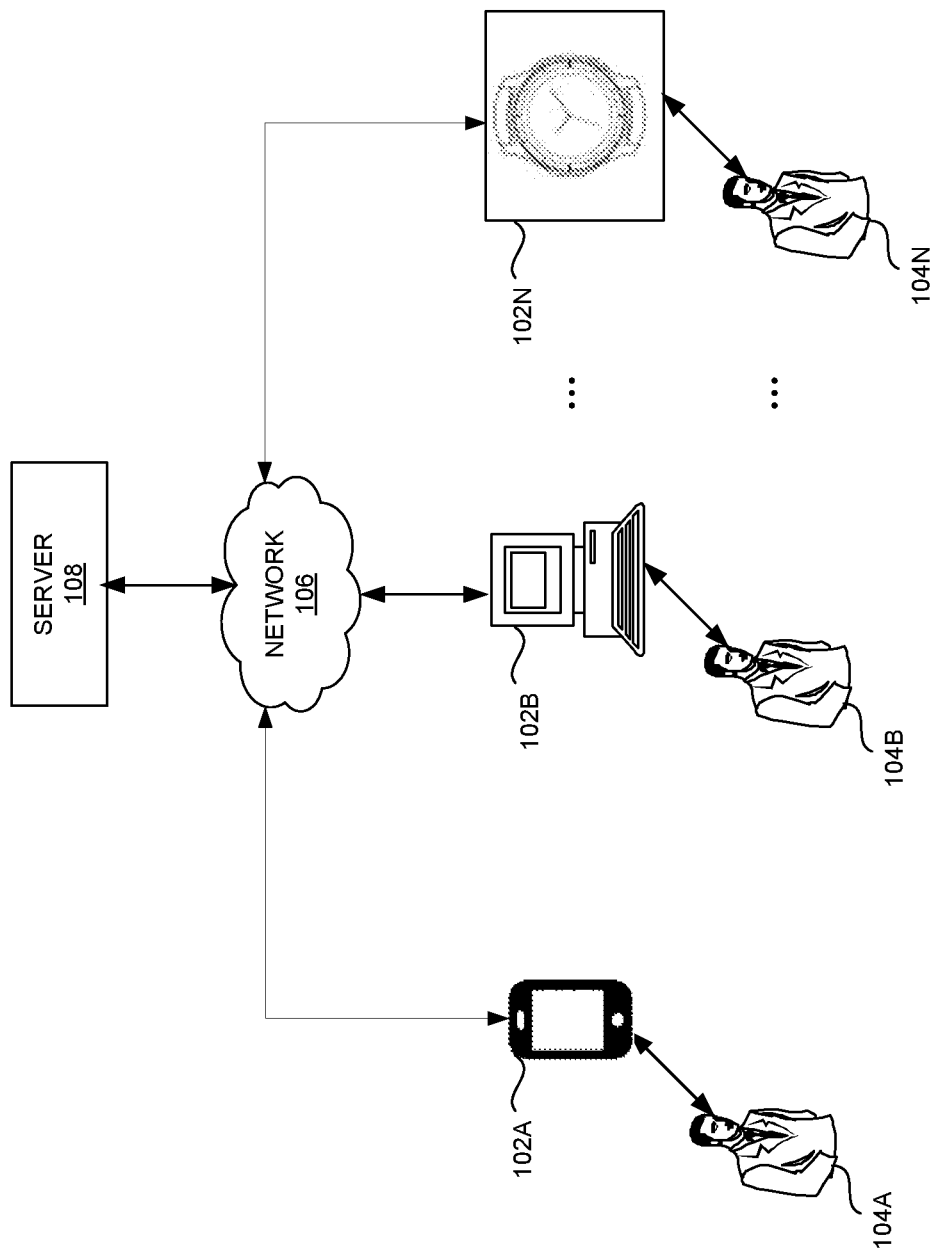
FIG. 1 depicts a network architecture for machine learning on a server.
Figure 2:
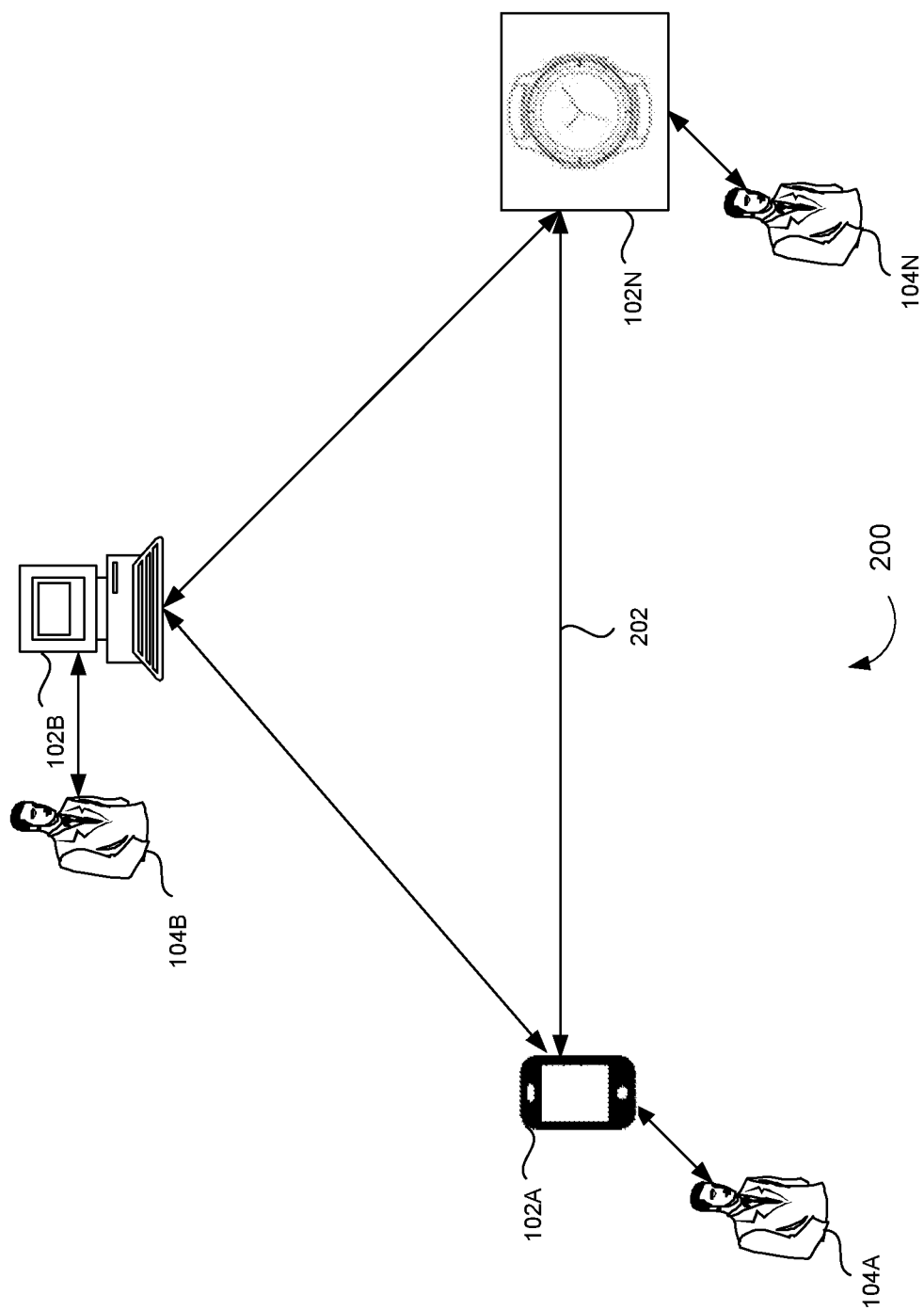
FIG. 2 is a block diagram that illustrates a system for sharing an incrementally trained machine learning (ML) model from one or more edge devices to other edge devices associated with a peer to peer network, according to some embodiments herein.

There remains a need for a system and method for sharing an incrementally trained machine learning (ML) model from an edge device to other edge devices associated with a peer to peer network. Referring now to the drawings, and more particularly to FIGS. 1 through 8, where similar reference characters denote corresponding features consistently throughout the figures, there are shown preferred embodiments FIG. 2 is a block diagram 200 that illustrates a system for sharing an incrementally trained machine learning (ML) model from one or more edge devices 102A-N to other edge devices associated with a peer to peer network 202 according to some embodiments herein. The block diagram 200 depicts the one or more edge devices 102A-N associated with the peer to peer network 202. In some embodiments, the one or more edge devices 102A-N, without limitation, may be selected from a mobile phone, a Personal Digital Assistant (PDA), a tablet, a desktop computer, or a laptop. In some embodiments, the one or more edge devices 102A-N include one or more network access points, such as, wired or wireless access points including base stations, internet exchange points, or any other type of entity having computation and networking capabilities. In an embodiment, each of the edge devices 102A-N may include a ML model sharing unit. In some embodiments, the ML model sharing unit may be implemented as a software development kit (SDK) that may be configured to get associated with one or more applications on the one or more edge devices 102A-N.

In some embodiments, the one or more edge devices 102A-N of the peer to peer network 202 receive a base version of the ML model. In some embodiments, the base version of the ML model may be generated by the one or more edge devices 102A-N using an authorized program. The ML model may include one or more parameters and one or more weights associated with the one or more parameters. In some embodiments, the one or more parameters without limitation, may be selected from gender, age, location, and a category of a content on a website or application. The one or more weights associated with the one or more parameters may indicate an amount of importance the respective parameters are given in decisions made by the ML model. For example, gender may have a weight of 0.4, while age may have a weight of 0.3. Upon occurrence of a data event at an edge device, e.g. a first edge device 102A from among the one or more edge devices 102A-N, the base version of the ML model is incrementally trained by the edge device, e.g. the first edge device 102A. The data event may include, for example, data associated with user inputs to particular applications, for example, usage of a relevant application or website by the users 104A-N.

In some embodiments, the edge device, e.g. the first edge device 102A associated with the peer-to-peer network 202 incrementally trains the base version of the ML model upon the occurrence of the data event to obtain an incrementally trained ML model. The incremental training is performed by updating the one or more weights associated with the one or more parameters of the ML model during a predetermined window of time. The predetermined window of time may include, for example, one individual event or a short batch of events. In some embodiments, the predetermined window of time may be configurable.

The edge device, e.g. the first edge device 102A generates a unique persistent file format of the incrementally trained ML model. The edge device, e.g. the first edge device 102A removes one or more details associated with specific data items used to train the incrementally trained ML model for generating the unique persistent file format. The edge device optimizes a payload associated with the unique persistent file format to include only certain parameters and/or weights that change beyond a predetermined configurable threshold. In some embodiments, the payload may be optimized by (i) extracting one or more parameters and one or more weights associated with the parameters from the specific data items, and (ii) determining if the extracted weights associated with the parameters are within or beyond a predetermined configurable threshold.

In some embodiments, the unique persistent file format encapsulates a unique metadata to ensure that the event data used for the incremental training of the ML model at the edge device, e.g. the first edge device 102A from among the one or more edge devices 102A-N is not re-used during incremental training at same or different edge devices so that the event data does not overly influence the incremental training of the ML model by demanding undue weight during the training process.

The edge device creates a hashed token for each event data item that is used to incrementally train the ML model. In some embodiments, the hashed token includes, but is not limited to, (i) a unique device id of the first edge device 102A from where an event originates, (ii) a timestamp of the event, and (iii) an event file size. In some embodiments, the hashed token is stored at the first edge device 102A. In some embodiments, the hashed token is used to compare against any subsequently submitted data item by a client-side code. In some embodiments, a subsequently submitted event data item is considered as new if the hashed token corresponding to the event does not match with any of previously submitted events.

In some embodiments, the unique persistent file format is encrypted with a key that corresponds to the edge device generating the unique persistent file format of the ML model to enable an authentication of the incrementally trained model generated at the edge device to prevent injection of unauthorized versions of the ML model into the peer to peer network 202. In some embodiments, the encrypted unique persistent file format enables the prevention of fraud by malicious actors by preventing injection of unauthorized versions of the ML model into the peer to peer network 202.

In some embodiments, the unique persistent file format is encrypted with a time stamp and one or more salting parameters. In some embodiments, the one or more salting parameters include at least one of hashed data, a password, or a passphrase. In some embodiments, the one or more salting parameters protect the incrementally trained ML models from any malicious actors intending to hack the incrementally trained ML model anywhere in the peer to peer network 202. In some embodiments, a unique code that is integrated into each edge device is used to decrypt an encrypted persistent file format.

Based on the file size of the unique persistent file format of the ML model and or a frequency of incremental updates applied on the ML model, a frequency of updates is automatically tuned to once every n data points per edge device, where n is the whole number, to preserve a maximum upper limit (for example, total Megabytes (Mb) transmitted across the network per hour) on the total network traffic volume per unit time. In some embodiments, the maximum upper limit may be set by a network owner.

Figure 3:
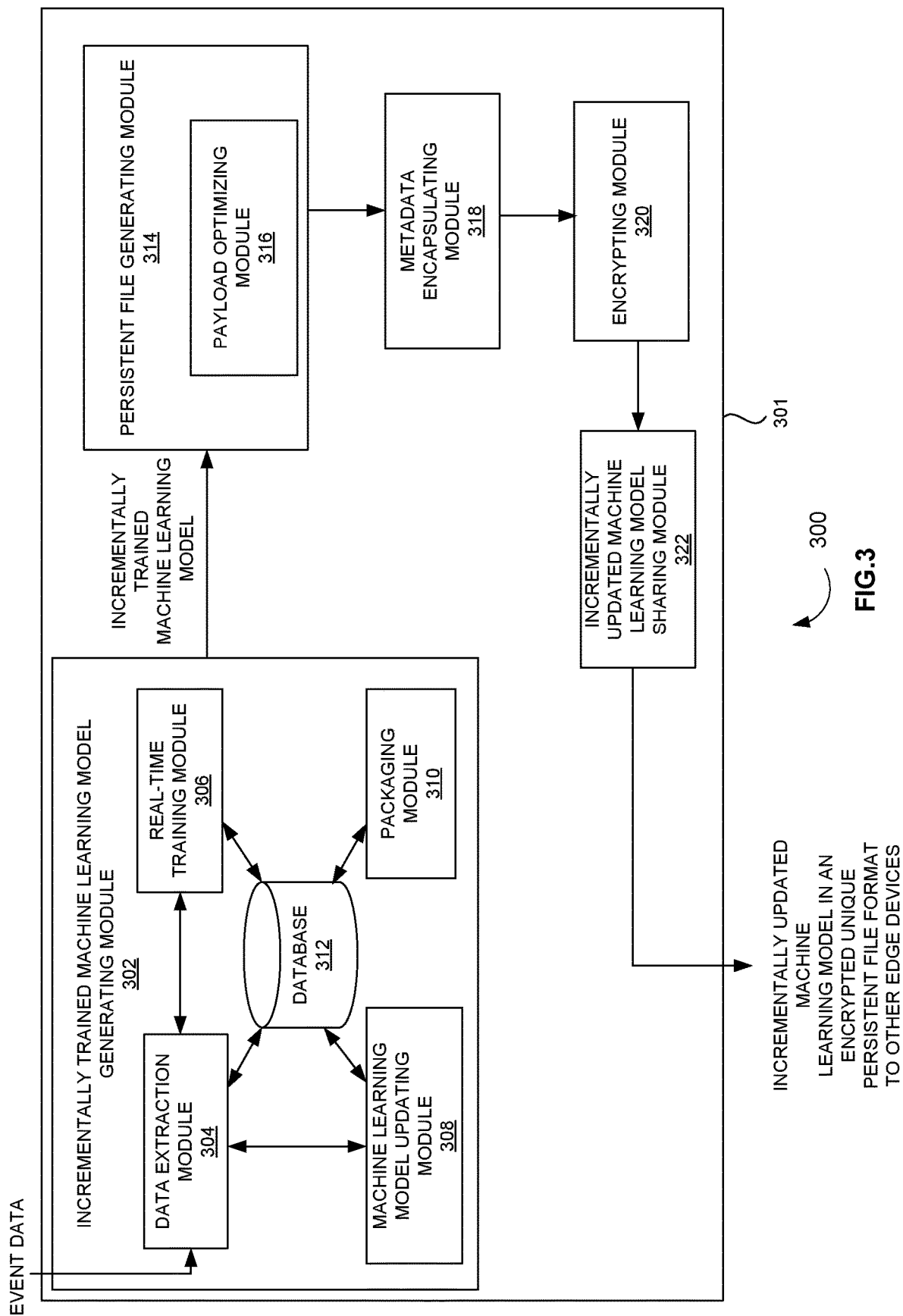
FIG. 3 is a block diagram of a Machine learning (ML) model sharing unit that is associated with a first edge device of the plurality of edge devices, according to some embodiments herein.

FIG. 3 is a block diagram 300 of an ML model sharing unit 301 associated with each of the one or more edge devices 102A-N of the peer to peer network 202, according to some embodiments herein. In some embodiments, the ML model sharing unit 301 is configured to incrementally train the ML model and generate the unique persistent file format of the ML model, according to various embodiments herein. In some embodiments, the ML model sharing unit 301 includes an incrementally trained ML model generating module 302, a persistent file generating module 314, a metadata encapsulating module 318, an encrypting module 320, and an incrementally updated ML model sharing module 322. The incrementally trained ML model generating module 302 includes a data extraction module 304, a real-time training module 306, a ML model updating module 308, and a packaging module 310 communicatively associated with a database 312.

The data extraction module 304 generates a base version of the ML model on each of the edge devices 102A-N using an authorized program. In some embodiments, the data extraction module 304 generates the base version of the ML model including learnings based on data that was previously seen by the edge devices 102A-N in the peer to peer network 202, by removing any underlying event data and retaining one or more parameters and one or more weights associated with the one or more parameters. The base version of the ML model may include the one or more parameters and the one or more weights associated with the one or more parameters. In some embodiments, the one or more parameters may include, but are not limited to gender, age, location, the category of the content on the website/application, etc. The one or more weights indicate an amount of importance the respective parameters are given in the decisions made by the ML model. For example, the gender may have a weight of 0.4, while age may have a weight of 0.3.

The real-time training module 306 incrementally trains the base version of the ML model at the first edge device 102A upon the occurrence of the data event at the first edge device 102A. The incremental training is performed by updating the one or more weights associated with one or more parameters of the ML model during a predetermined window of time. The predetermined window of time may include, for example, one individual event or a short batch of events. In some embodiments, the predetermined window of time may be configurable. In some embodiments, the updates are applied in real-time on receipt of the event data. In some embodiments, the learnings are devoid of an underlying event data used to generate the incremental version of the ML model. During the incremental training process described herein, a previous version of the ML model may be used as a baseline, or if no such previous version of the ML model is available, then a base version of the ML model may be generated and/or used.

The packaging module 310 shares the updated weights associated with the parameters and/or one or more parameters of the incrementally trained ML model to one or more other edge devices 102A-N in the peer to peer network 202. In some embodiments, the one or more weights and/or the parameters shared between the one or more other edge devices are devoid of any of the underlying data items used to generate the incremental version of the ML model, such as the event data, thereby ensuring data security.

The ML model updating module 308 is configured to update an ML model based on the updated weights received from the real-time incremental training of the ML model at other edge devices of the peer to peer network 202. During a first instance, a base version of the ML model available at the plurality of edge devices 102A-N may be updated based on the updated weights and/or the one or more parameters received from the one or more other edge devices. The ML model updating module 308 may update the updated version of the ML model based on subsequent receipts of the one or more weights and/or the one or more parameters from the one or more other edge devices. The real-time training module 306 incrementally trains the updated ML model upon occurrence/receipt of the event data at the first edge device 102A. For example, upon receiving a user selection of purchase items in an application in a mobile phone of a user, the user device incrementally trains the updated ML model based on the data associated with the user selection.

The persistent file generating module 314 includes a payload optimizing module 316. The persistent file generating module 314 generates a unique persistent file format of the incrementally trained machine learning (ML) model devoid of any details associated with the event data used for the incrementally training the machine learning (ML) model. The payload optimizing module 316 optimizes a payload with the one or more parameters and/or the one or more weights that exceeds a predetermined configurable threshold. In some embodiments, the payload optimizing module 316 computes the payload by (i) extracting, using the persistent file, one or more parameters and/or one or more weights corresponding to the one or more parameters associated with the event data and (ii) determining, if the one or more weights corresponding to the one or more parameters exceeds beyond the predetermined configurable threshold.

The metadata encapsulating module 318 encapsulates the unique persistent file format with a unique metadata to restrict the event data used for the incremental training of the ML model at a first edge node to be re-used during incremental training at same or different edge node. For example, the event data used by the first edge device 102A for incremental training of ML models may not be re-used by other edge devices for training ML models in the peer to peer network 202. The encrypting module 320 encrypts the unique persistent file format with a key that corresponds to the first edge device 102A to enable an authentication of the incrementally trained ML model generated at the first edge device 102A to prevent injection of unauthorized versions of the ML model into the peer to peer network 202. In some embodiments, the persistent file is encrypted with time stamp and salting parameters. The incrementally updated ML model sharing module 322 shares the incrementally updated ML model in the encrypted unique persistent file format from the first edge device 102A to one or more other edge devices of the peer to peer network 202.

FIG. 4 illustrates a table 400 that illustrates a unique persistent file according to some embodiments herein. The table 400 includes a public key 402A and a private key 402B and salting parameters 404. In some embodiments, an edge device of the plurality of edge devices 102A-N encrypts a persistent file with the public key 402A and the private key 402B correspond to the edge device to enable an authentication to the other edge devices associated with the peer to peer network 202 to access an incrementally trained machine learning (ML) model at the edge device of the one or more edge devices 102A-N. In some embodiments, the persistent file is encrypted with time stamp and the salting parameters 404. In some embodiments, the salting parameters 404 include at least one of hashed data, a password, or a passphrase.

Figure 5:
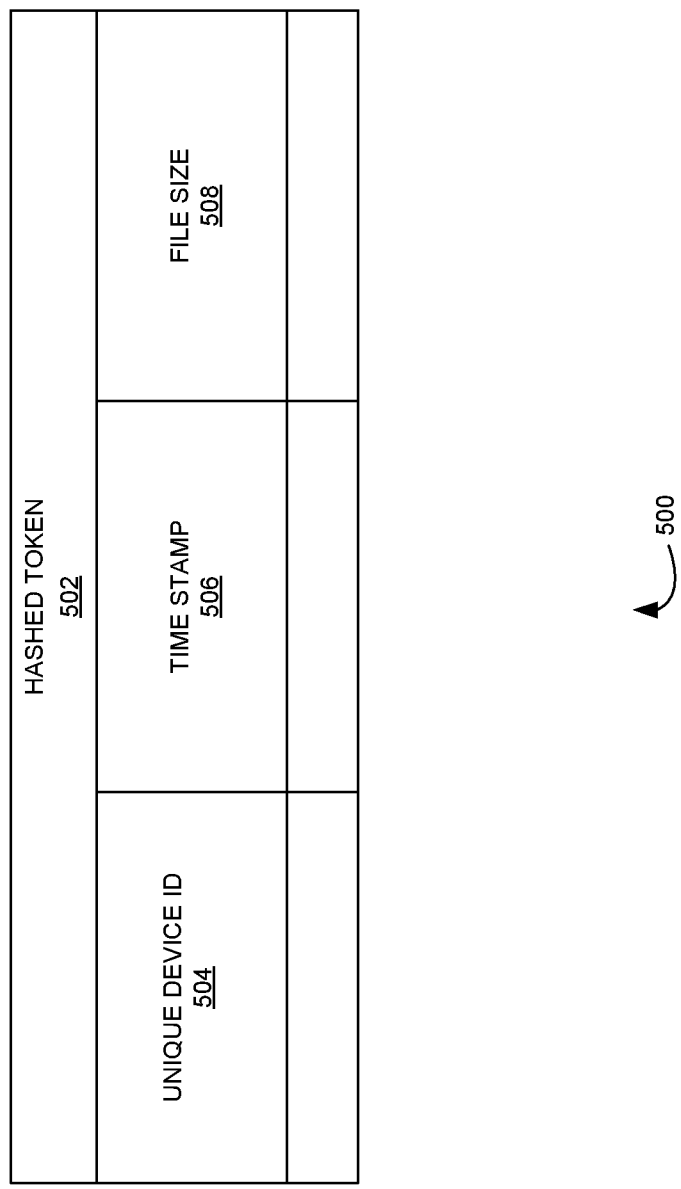
FIG. 5 illustrates a table that illustrates a hashed token that is stored in the edge device associated with the peer to peer network, according to some embodiments herein.

FIG. 5 illustrates a table 500 that illustrates a hashed token 502 that is stored in an edge device associated with the peer to peer network 202, according to some embodiments herein. The hashed token 502 includes (i) a unique device id 504 of an edge device, e.g. the first edge device 102A where an event originates, (ii) timestamp 506 of the event, and (iii) the event file size 508. In some embodiments, the hashed token 502 is stored within the edge device, e.g. the first edge device 102A.

Figure 6:
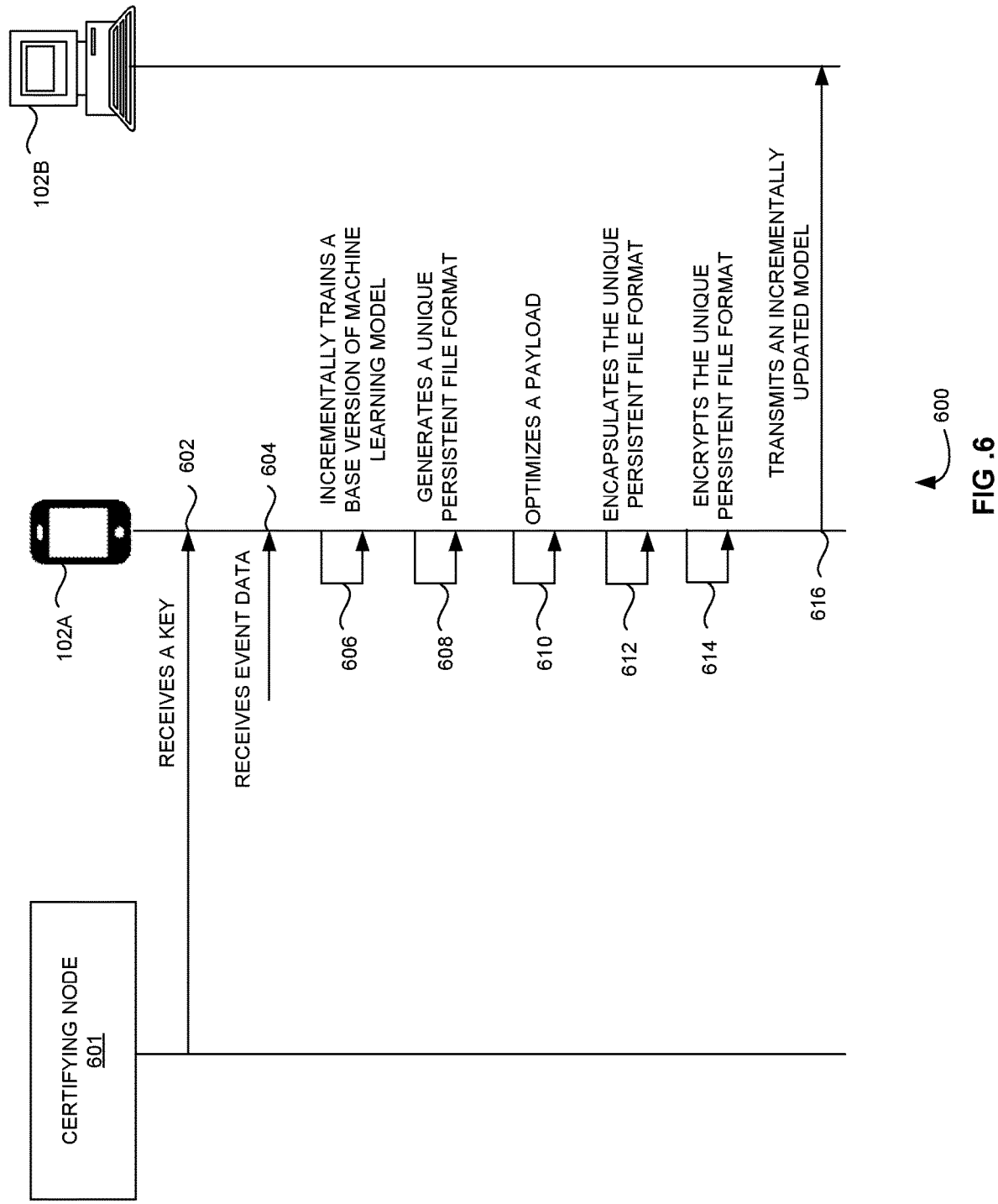
FIG. 6 is an interaction diagram that illustrates a method for sharing an incrementally trained machine learning (ML) model from a first edge device to a second edge device associated with a peer to peer network, according to some embodiments herein.

FIG. 6 is an interaction diagram that illustrates a method 600 for sharing an incrementally trained machine learning (ML) model from the first edge device 102A to a second edge device 102B that is associated with the peer to peer network 202 according to some embodiments herein. At step 602, the method includes receiving a key by the first edge device 102A from a certifying node 601 of the peer to peer network 202. The certifying node may be communicatively associated with one or more edge devices 102A-N of the peer to peer network 202 and may be configured to control the incremental training of the ML models in the peer to peer network 202. In some embodiments, the certifying node 601 assigns the key that includes the public key 402A and the private key 402B to the first edge device 102A once the first edge device 102A is associated with the peer to peer network 202. In some embodiments, the public key 402A and the private key 402B are used to authenticate all subsequent communication between the first edge device 102A and the certifying node 601. At step 604, the method 600 includes receiving event data at first edge device 102A of the peer to peer network 202 upon the occurrence of an event at the first edge device 102A. At step 606, the method 600 includes incrementally training a base version of a ML model at the first edge device 102A based on the received event data. At step 608, the method 600 includes generating, a unique persistent file format of the incrementally trained ML model at the first edge device 102A. The unique persistent file format includes one or more parameters and one or more weights associated with the one or more parameters associated with the event data used to incrementally train the ML model. However, the unique persistent file format is devoid of the event data as such. At step 610, the method 600 includes optimizing a payload associated with the unique persistent file format to include one or more parameters with associated weights changing beyond a predetermined configurable threshold.

In some embodiments, the optimization of the payload facilitates transmission of the incrementally trained ML model without adversely affecting model accuracy and consistency. At step 612, the method 600 includes encapsulating the unique persistent file format with a unique metadata to restrict the event data used for the incremental training of the ML model at the first edge device 102A to be re-used during incremental training at same or different edge devices. At step 614, the method 600 includes encrypting the unique persistent file format with a key that corresponds to the first edge device 102A to enable an authentication of the incrementally trained model generated by the first edge device 102A to prevent injection of unauthorized versions of the ML model into the peer to peer network 202. At step 616, the method 600 includes transmitting the incrementally updated ML model in the encrypted unique persistent file format from the first edge device 102A to the second edge device 102B associated with the peer to peer network 202. In some embodiments, the certifying node 601 verifies if the incrementally trained ML model originates from the first edge device 102A associated with the peer to peer network 202 with the encrypted unique persistent file format. In some embodiments, the certifying node 601 validates the encrypted unique persistent file format by verifying that the public key 402A and/or the private key 402B associated with the first edge device 102A was used to encrypt the unique persistent file format. In some embodiments, the certifying node 601 verifies if the incrementally trained ML model originates from the first edge device 102A associated with the peer to peer network 202 using the salting parameters.

Figure 7:
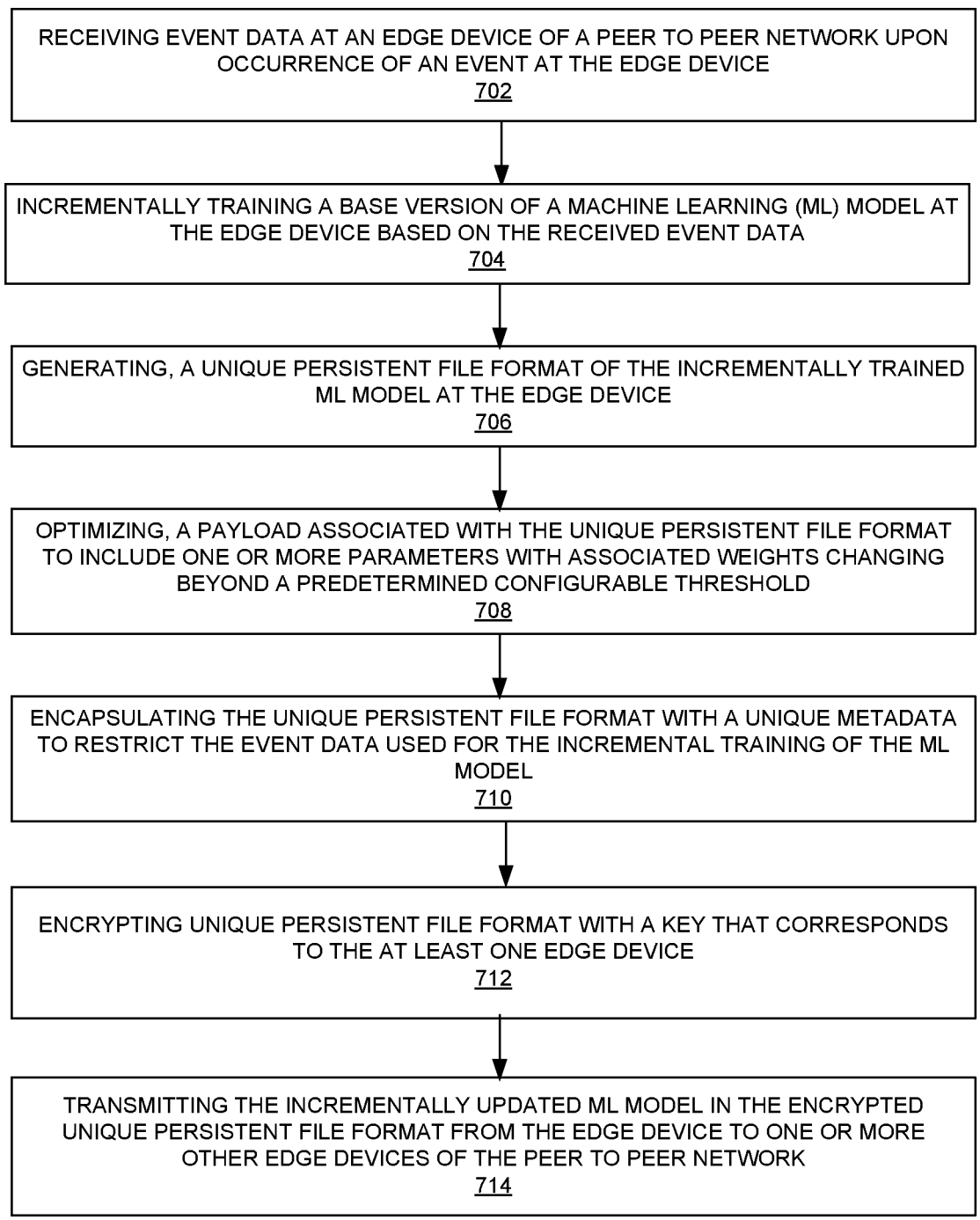
FIG. 7 is a flow diagram that illustrates a method of sharing an incrementally trained machine learning (ML) model from an edge device to other edge devices associated with a peer to peer network, according to some embodiments herein.

FIG. 7 is a flow diagram that illustrates a method 700 for sharing an incrementally trained machine learning (ML) model from an edge device to other edge devices that are associated with the peer to peer network 202 according to some embodiments herein. At step 702, the method 700 includes receiving event data at an edge device, e.g. the first edge device 102A from among the one or more edge devices 102A-N of the peer to peer network 202 upon occurrence of an event at the edge device. At step 704, the method 700 includes incrementally training a base version of a ML model at the edge device based on the received event data. At step 706, the method 700 includes generating, a unique persistent file format of the incrementally trained ML model at the edge device. At step 708, the method 700 includes optimizing a payload associated with the unique persistent file format to include one or more parameters with associated weights changing beyond a predetermined configurable threshold. At step 710, the method 700 includes encapsulating the unique persistent file format with a unique metadata to prevent re-use of the event data used for the incremental training of the ML model at same or different edge device. At step 712, the method 700 includes encrypting unique persistent file format with a key that corresponds to the edge device to enable an authentication of the incrementally trained model generated at the edge device. At step 714, the method 700 includes transmitting the incrementally updated ML model in the encrypted unique persistent file format from the edge device to one or more other edge devices of the peer to peer network 202. In some embodiments, any subsequent incremental training run, on another edge device, starts by loading the one or more parameters and the one or more weights stored in the unique persistent file format of the ML model, and the ML model is further incrementally trained by using only one or more new data points associated with the other edge devices of the peer to peer network 202. For the purpose of illustration, the above description refers to "an edge device" but the scope of various embodiments is not limited to an edge device, but may be extended to include the plurality of edge devices 102A-N of the peer to peer network 202.

Various embodiments herein enable preservation of user data privacy as the user data stays with the edge device (e.g. user device) and does not get aggregated on any server, thereby eliminating risk of data leaks caused by hacks of a central server. For example, sensitive health signals that are available to an application on a wearable device such as a smart watch may now be used to predict a probability of the user getting a disease, without concerns about sending such sensitive data to a server. Various embodiments enable machine learning to happen in real-time, as soon as a data event occurs on the edge device, thereby improving the quality of the decisions made by the ML model.

In another example, to overcome COVID-19, and other global health challenges, instead of aggregating all user data on a server (i.e. instead of sending the user data to the server having the ML model), the user data stays with the edge device and the ML model of other edge devices in the peer to peer network 202 is shared with the edge device to incrementally train it. This makes life-and-death decisions on which patients to prioritize, and what treatments they should get. The ML model is shared with each edge device, and learns from their data. Each edge device shares those learnings (not the raw user data), with the other edge devices in the peer to peer network 202, and brings together the learnings from all the edge devices. The process and system disclosed herein deliver same high-quality personalization as those legacy centralized systems in real-time, so the system can leverage the latest trends, without waiting for a nightly or weekly model training run.

In an example embodiment, the process and system disclosed herein enable the edge devices to learn from data events throughout their lifecycle. Further, the process and system disclosed herein enables learnings from all edge devices in the peer to peer network 202, without the need to pool their raw data on a server and shares the learnings between the edge devices, not user data or raw data. The process and system disclosed herein uses learnings across the edge devices to predict the lifetime value (LTV) of a new edge device early (i.e. as early as a first-time experience), and with high precision, especially for the mobile application. The edge devices feed learning data back to tune and optimize their campaigns in a timely manner, in order to reach the target LTV expeditiously. For example, even when preserving user data privacy without concerns about sending such sensitive data to a server by moving ML model training and inferencing to the edge device, the edge device may still learn, without needing to aggregate user data on a server, with or without user or device ID's.

The process and system disclosed herein provides peer-to-peer machine learning platform that can provide real time ML based decisions, while preserving the security of user sensitive data. The ML technology performs both model training and decisioning in real time, entirely on the edge device, in a federated manner, thereby eliminating the need for aggregating user/edge device data centrally for building ML models. Thus, the user data remain confidential data in the edge device and never need to leave a firewall of the edge device. The learnings from the user data can be combined with similar learnings of other edge devices in peer to peer network 202, in order to improve patients' diagnoses.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
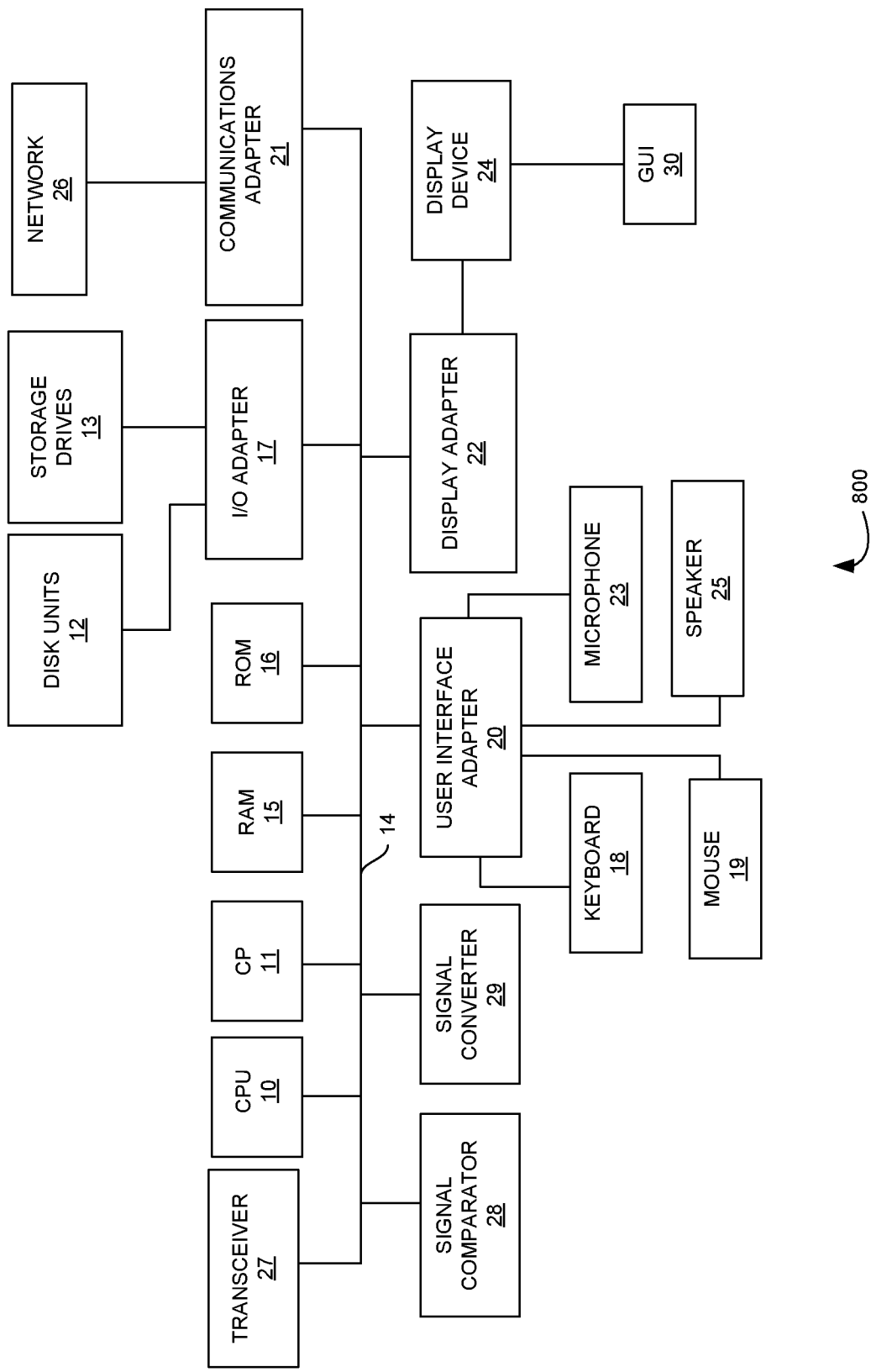
FIG. 8 is a block diagram of a schematic diagram of a device used in accordance with embodiments herein.

A representative hardware environment for practicing the embodiments herein is depicted in FIG. 8, with reference to FIGS. 2 through 7. This schematic drawing illustrates a hardware configuration of edge device or certifying node, in accordance with the embodiments herein. The hardware configuration includes at least one processing device 10 and a cryptographic processor 11. The special-purpose CPU 10 and the cryptographic processor (CP) 11 may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The hardware configuration can read the inventive instructions on the program storage devices and follow these instructions to execute the methodology of the embodiments herein. The hardware configuration further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within their spirit and scope of the appended claims.

What is claimed is:

1. A processor-implemented method for sharing an incrementally trained machine learning (ML) model from a first edge device to other edge devices in a peer to peer network, said method comprising:

generating a unique persistent file of the incrementally trained ML model at the first edge device by removing one or more details associated with specific event data items used to incrementally train a base version of a first ML model, wherein the one or more details comprises details associated with the user, wherein the first ML model comprises at least one parameter and at least one weight associated with the at least one parameter, wherein the unique persistent file optimizes a payload by including the at least one parameter and the weight associated with the at least one parameter that has changed beyond a predetermined configurable threshold;

creating a hashed token for each event data item used to incrementally train the ML model, wherein the hashed token comprises at least (i) a unique device ID of the first edge device, (ii) a timestamp of the event, and (iii) an event file size, and wherein the hashed token is stored at the first edge device for comparison against subsequently submitted event data items to prevent re-use of previously submitted event data during incremental training at the same or different edge devices;

encapsulating the unique persistent file with a unique metadata to ensure that event data used for the incremental training of the first ML model at the edge device is not re-used at the same or different edge devices, wherein the metadata comprises the hashed token comprising at least (i) the unique device ID of the first edge device, (ii) the timestamp of the event, and (iii) the event file size;

enabling an authentication of the incrementally trained ML model generated at the first edge device by encrypting the unique persistent file of the incrementally trained ML model, wherein the encryption is performed using a key corresponding to the first edge device to prevent injection of unauthorized versions of the ML model into the peer-to-peer network; and incrementally training a second ML model at other edge devices in the peer-to-peer network by transmitting the incrementally trained ML model in the encrypted unique persistent file from the first edge device to the other edge devices in the peer-to-peer network.

2. The processor-implemented method of claim 1, wherein the incremental training of the first ML model is performed by updating the at least one weight associated with the at least one parameter of the first ML model during a predetermined window of time.

3. The processor-implemented method of claim 1, wherein the key comprises a public key and a private key correspond to the first edge device.

4. The processor-implemented method of claim 1, wherein the unique persistent file is encrypted with a time stamp and at least one salting parameter.

5. The processor-implemented method of claim 1, wherein the payload associated with the unique persistent file is optimized by
  (i) extracting the at least one parameter and the at least one weight associated with the at least one parameter from the specific event data items, and
  (ii) determining if the at least one weight associated with the at least one parameter has changed beyond the predetermined configurable threshold.

6. The processor-implemented method of claim 1, wherein the method further comprises automatically tuning a frequency of updates to the first ML model to once every n data points per edge device based on a file size of the unique persistent file of the first ML model.

7. The processor-implemented method of claim 6, wherein the frequency of updates to the first ML model is automatically tuned based on a frequency of incremental updates applied on the first ML model.

8. One or more non-transitory computer readable mediums storing instructions, which when executed by a processor, causes to perform a method of sharing an incrementally trained machine learning (ML) model from a first edge device to other edge devices in a peer to peer network, the method performs the steps of:
  generating a unique persistent file of the incrementally trained ML model at the first edge device by removing one or more details associated with specific event data items used to incrementally train a base version of a first ML model, wherein the one or more details comprises details associated with the user, wherein the first ML model comprises at least one parameter and at least one weight associated with the at least one parameter, wherein the unique persistent file optimizes a payload by including the at least one parameter and the weight associated with the at least one parameter that has changed beyond a predetermined configurable threshold;
  creating a hashed token for each event data item used to incrementally train the ML model, wherein the hashed token comprises at least (i) a unique device ID of the first edge device, (ii) a timestamp of the event, and (iii) an event file size, and wherein the hashed token is stored at the first edge device for comparison against subsequently submitted event data items to prevent re-use of previously submitted event data during incremental training at the same or different edge devices;
  encapsulating the unique persistent file with a unique metadata to ensure that event data used for the incremental training of the first ML model at the edge device is not re-used at the same or different edge devices, wherein the metadata comprises the hashed token comprising at least (i) the unique device ID of the first edge device, (ii) the timestamp of the event, and (iii) the event file size;
  enabling an authentication of the incrementally trained ML model generated at the first edge device by encrypting the unique persistent file of the incrementally trained ML model, wherein the encryption is performed using a key corresponding to the first edge device to prevent injection of unauthorized versions of the ML model into the peer-to-peer network; and
  incrementally training a second ML model at other edge devices in the peer-to-peer network by transmitting the incrementally trained ML model in the encrypted unique persistent file from the first edge device to the other edge devices in the peer-to-peer network.

9. The one or more non-transitory computer readable storage mediums storing instructions of claim 8, wherein the key comprises a public key and a private key correspond to the first edge device.

10. The one or more non-transitory computer readable storage mediums storing instructions of claim 8, wherein the unique persistent file is encrypted with a time stamp and at least one salting parameter.

11. The one or more non-transitory computer readable storage mediums storing instructions of claim 8, wherein the payload associated with the unique persistent file is optimized by
  (i) extracting the at least one parameter and the at least one weight associated with the at least one parameter from the specific event data items, and
  (ii) determining if the at least one weight associated with the at least one parameter beyond the predetermined configurable threshold.

12. A system that comprises a first edge device that shares an incrementally trained machine learning (ML) model to other edge devices in a peer to peer network, said first edge device comprising:
  a processor that is configured to
    generate a unique persistent file of the incrementally trained ML model at the first edge device by removing one or more details associated with specific event data items used to incrementally train a base version of a first ML model, wherein the one or more details comprises details associated with the user, wherein the first ML model comprises at least one parameter and at least one weight associated with the at least one parameter, wherein the unique persistent file optimizes a payload by including the at least one parameter and the weight associated with the at least one parameter that has changed beyond a predetermined configurable threshold;
    create a hashed token for each event data item used to incrementally train the ML model, wherein the hashed token comprises at least (i) a unique device ID of the first edge device, (ii) a timestamp of the event, and (iii) an event file size, and wherein the hashed token is stored at the first edge device for comparison against subsequently submitted event data items to prevent re-use of previously submitted event data during incremental training at the same or different edge devices;
    encapsulate the unique persistent file with a unique metadata to ensure that event data used for the incremental training of the first ML model at the edge device is not re-used at the same or different edge devices, wherein the metadata comprises the hashed token comprising at least (i) the unique device ID of the first edge device, (ii) the timestamp of the event, and (iii) the event file size;

enable an authentication of the incrementally trained ML model generated at the first edge device by encrypting the unique persistent file of the incrementally trained ML model, wherein the encryption is performed using a key corresponding to the first edge device to prevent injection of unauthorized versions of the ML model into the peer-to-peer network; and incrementally train a second ML model at other edge devices in the peer-to-peer network by transmitting the incrementally trained ML model in the encrypted unique persistent file from the first edge device to the other edge devices in the peer-to-peer network.

\* \* \* \* \*